Patented Jan. 29, 1952

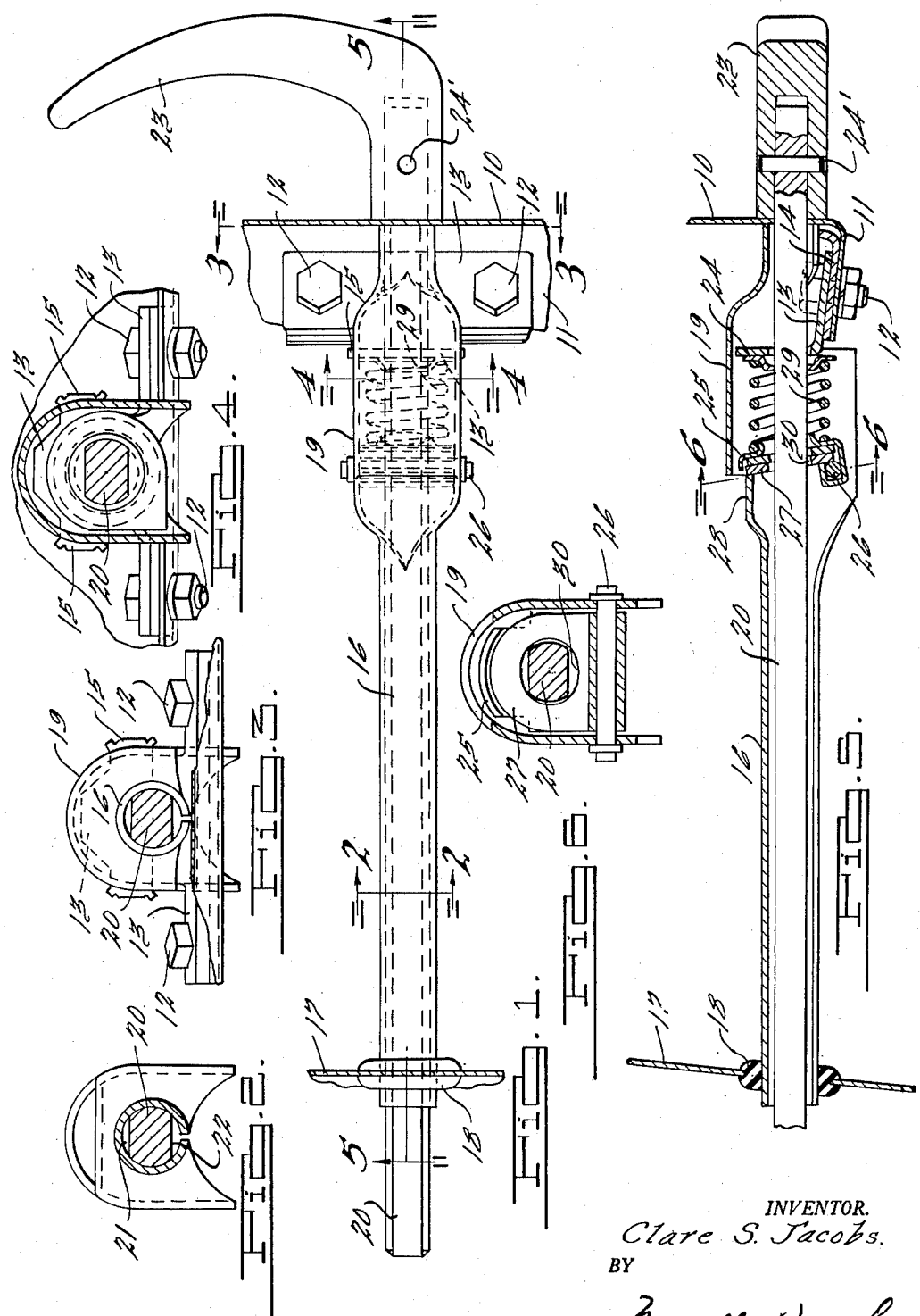

2,583,776

UNITED STATES PATENT OFFICE 2,583,776

BRAKE LEVER

Clare S. Jacobs, Grosse Pointe Park, Mich., assignor to F. L. Jacobs Co., Detroit, Mich., a corporation of Michigan Application October 20, 1950, Serial No. 191,301

2 Claims. (Cl. 74—531)

This invention relates to an improved brake lever for setting and releasing the parking or emergency brake of a motor vehicle.

An object of the invention is to provide a simple and economically constructed brake actuating mechanism which is capable of being set in an infinite number of locked positions rather than in a relatively few spaced positions as generally provided in brake actuators using ratchet-type lock means.

A further object is to provide a brake actuating lever which is held in locked position by friction, which may be actuated to locked position by a straight line pull, and which may be released by axial turning of the lever.

These and other objects of the invention will be apparent from the following description and accompanying drawing.

In the drawing:

Fig. 1 is a plan view of the brake actuating lever showing details of the mounting thereof in the motor vehicle;

Fig. 2 is a sectional view in the direction of the arrows along line 2—2 of Fig. 1;

Fig. 3 is a sectional view in the direction of the arrows along line 3—3 of Fig. 1;

Fig. 4 is a sectional view in the direction of the arrows along line 4—4 of Fig. 1;

Fig. 5 is a sectional view in the direction of the arrows along line 5—5 of Fig. 1; and Fig. 6 is a sectional view in the direction of the arrows along line 6—6 of Fig. 5.

Referring to the figures, wherein reference characters have been used to designate the various parts, it may be seen that the instrument panel 10 of the vehicle is provided with a turned-under flange 11 to which is secured by bolts 12 a bracket 13. A stiffening member 14 is welded to the flange 11 at this point to rigidify the structure.

The bracket 13 has an upwardly bent portion provided with lugs 15 which are adapted to extend through the side walls of a housing 16. The latter houses the assembly and extends between the instrument panel 10 and the vehicle dash 17. A rubber grommet 18 mounts the outer end of the housing 16 in the dash 17 as illustrated. The housing is circular in cross-section for a portion of its length and has an enlarged portion 19, open at the bottom, adjacent the bracket 13 for enclosing the operating parts of the lock mechanism.

The actuating element of the brake lever consists of a rod 20 formed with opposite flat faces 21, 22 and with intervening cylindrical portions. One end of the rod has a handle 23 secured thereto by a pin $24^1$ and the other end may be secured to the vehicle brake mechanism by any suitable connecting means such that a straight pull of the handle 23 will apply the parking or emergency brake.

The bracket 13 is apertured to receive the rod 20 which is freely slidable therein. A retainer 24 is spotwelded to the vertical leg of the bracket and a second retainer 25 is secured in the enlarged portion 19 of the housing by means of a pin 26. The second retainer carries a pair of detent washers 27 which are made of hardened steel. The housing portion 19 has a pierced portion 28 which is bent horizontally to form a shoulder against which the upper portion of the washers 27 rest.

A coil spring 29 exerts its force against the two retainers 24 and 25 which are shaped to receive the ends of the coil as shown. The washers 27 are provided with openings 30 which are substantially elliptical, or at least the horizontal diameter of the openings is slightly greater than the vertical diameter thereof, such that when the rod 20 is in such position that the flat portions 21, 22 thereof are at top and bottom, as illustrated, the rod will slide freely through the openings 30 in either direction of movement. When the rod 20 is turned 90°, the rounded portions thereof will engage the openings 30 at the top and bottom across the smaller diameter, and while movement of the rod toward the right of the drawing is permitted, movement thereof in the opposite direction will be resisted by "biting" engagement of the washers 27 on the rounded portions of the rod because of the slight tilt of the washers. This frictional engagement will lock the rod against leftward movement, but rightward movement is permitted because the washers will tend to assume a vertical position permitted by the spring 29 when the handle 23 is pulled.

It may thus be seen that the vehicle operator may apply the parking brakes of the vehicle by means of a straight pull of the handle 23 with the handle in either its horizontal or vertical position. If the handle is in vertical position, release of the handle will automatically lock the rod 20 in whatever position it has been left because of the frictional engagement between the washers 27 and the rounded portions of the rod. To release the brakes, the handle is turned 90° to horizontal position, as illustrated, and the rod will travel freely through the openings in the washers 27 because of the clearance provided by the flats 21, 22, and the enlarged horizontal diameter of the holes 30.

Of course, the brakes may be applied with the handle 23 in horizontal position and then the handle may be turned 90° to lock the rod. Because the rod 20 may be locked anywhere along its length, and released simply by turning the handle 90°, the effort needed to apply the brakes fully is lessened and the effort needed to release the brakes is small and is the same regardless of the degree of application thereof. This latter feature is a decided advantage because of the difficulty frequently experienced in releasing conventional ratchet-type brake levers which must be moved toward brake applying position before the ratchet can be released.

While I have illustrated and described but one of the many possible forms of my invention, it is to be understood that I do not thereby intend to limit the invention, as changes may be made in the arrangement and proportions of the parts without departing from the spirit and scope of the invention as set forth in the claims appended hereto.

I claim:

1. An automotive vehicle brake operator comprising a rod mounted in the vehicle and adapted for longitudinal movement to apply the brakes, said rod having circumferentially spaced flat portions extending along its length, lock means for locking said rod against movement in one direction comprising a normally inclined washer having a substantially elliptical aperture loosely engaging said rod, the aperture in said washer having edges adapted to frictionally engage the rod when the latter is in one rotative position and to permit sliding of the rod when the latter is in another rotative position.

2. The combination set forth in claim 1 wherein said washer is yieldably held in its normally inclined position.

CLARE S. JACOBS.

REFERENCES CITED

The following references are of record in the file of this patent:

UNITED STATES PATENTS

| Number | Name | Date |
|--------|------|------|
| 1,738,862 | Wiswell | Dec. 10, 1929 |
| 2,170,900 | Jandus et al. | Aug. 29, 1939 |